United States Patent Office 3,483,236
Patented Dec. 9, 1969

3,483,236
METHOD OF PREPARING 16α,17α-DIMETHYLPREGN-20-ONES
Robert Eugene Schaub, Upper Saddle River, and Martin Joseph Weiss, Oradell, N.J., assignors to American Cyanamid Company, Stamford, Conn., a corporation of Maine
No Drawing. Filed Oct. 28, 1966, Ser. No. 590,179
Int. Cl. C07c *167/00, 169/34*
U.S. Cl. 260—397.45                                2 Claims

ABSTRACT OF THE DISCLOSURE

A process for the preparation of 16α,17α-dimethylpregn-20-ones by treating 16-dehydropregn-20-one with a methyl magnesium halide or methyl lithium in the presence of a nonprototropic solvent, and subsequently treating with a methyl halide. The products produced are useful as anti-inflammatory agents.

This invention relates to new steroid compounds. More particularly, it relates to 9α-fluoro-11-hydroxy-16α, 17α-dimethylpregna-1,4-diene-3,20-diones of the following formula, and to a process for the preparation thereof:

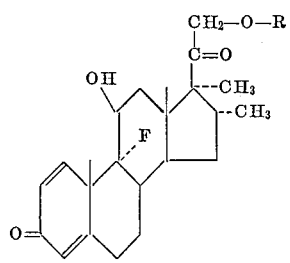

in which R is a member of the group consisting of hydrogen and alkanoyl.

The novel compounds of this invention are white crystalline substances which are purified by the usual techniques of recrystallization and chromatography.

The preparation of the present compounds and intermediates is illustrated in the following flowsheet.

FLOWSHEET

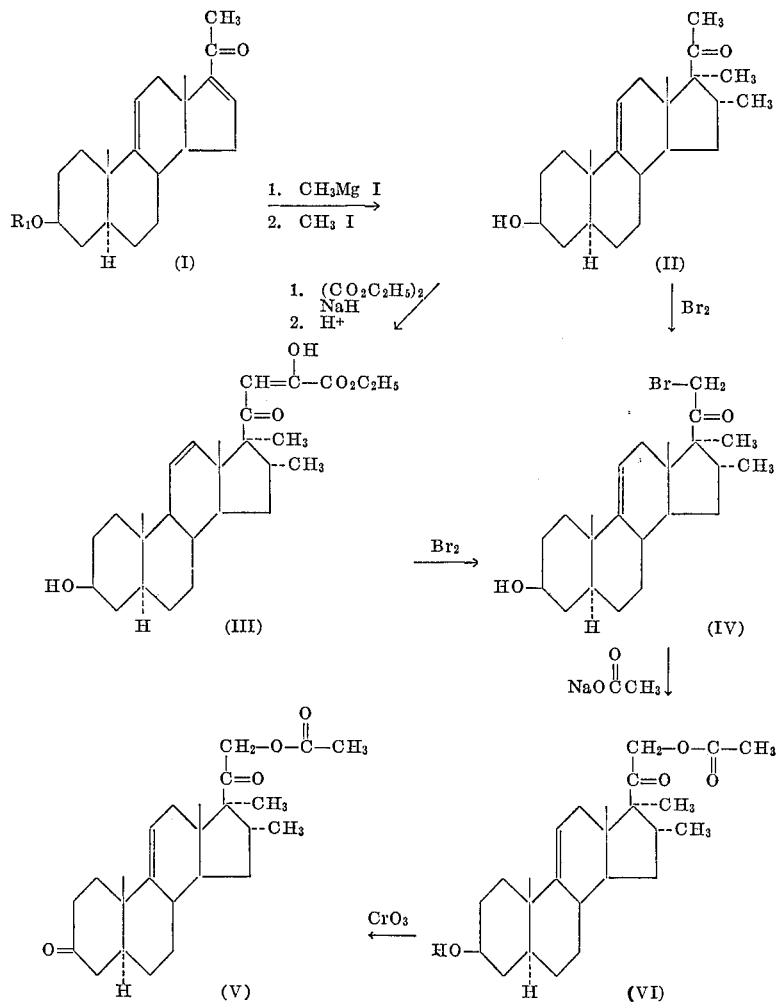

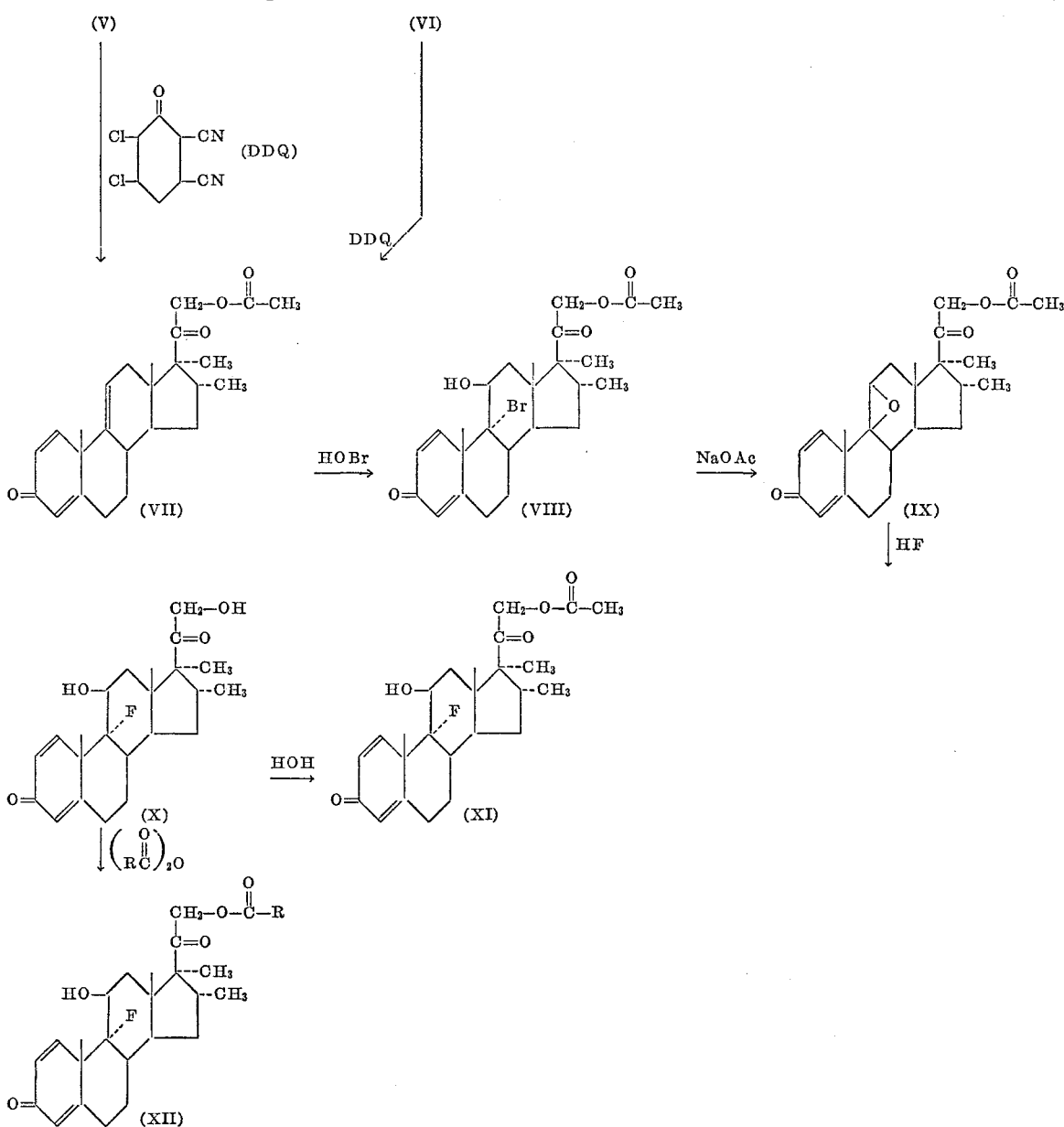

wherein R is alkyl and $R_1$ is lower alkanoyl or tetrahydropyranyl.

The novel compounds of this invention, are very potent anti-inflammatory agents and thereby are useful for the treatment of various collogen diseases, such as, arthritis, for the treatment of asthma, and for the treatment of various dermatologiual disorders. For example, when 21-avetoxy - 9α - fluoro-11β-hydroxy-16α-17-dimethylpregna-1,4-diene-3,20-dione (Example 10), was evaluated in a standard 48-hour rat thymolytic assay [described in Endocrinology, 66, 900 (1960)] by the subcutaneous route of administration, it was found to have a potency relative to the clinically-useful hydrocortisone of 14.5 (95% confidence limits: 7.5 and 29.8) and relative to the clinically-useful drugs prednisone, prednisolone, 6-methylprednisolone, fluoroprednisolone, and triamcinolone it was about 2 to 7 times more potent. Furthermore, it is significant that unlike many other 9α-fluoro-substituted corticoids, this compound not only does not cause the characteristic urine and sodium retention leading to edematous conditions, on the contrary, its administration can result in urine and sodium excretion.

The compounds of this invention are conveniently prepared from the known compound, 3β-acetoxy-5α-pregna- 9(11),16-diene-3,20-dione (Ia) [R. K. Callow and V. H. T. James, J. Chem. Soc., 4739 (1956)].

Introduction of the methyl groups into the 16α- and 17α-positions is smoothly achieved by a novel reaction involving 1,4-addition of a methyl magnesium halide or methyl lithium to the $\Delta^{16}$-20-keto function of I (also see A) preferably the 3-tetrahydropyranyl derivative. This reaction is carried out in a non-prototropic solvent. The resulting intermediate 17,20-enolate (B) is then treated with a methylating agent for the introduction of the 17-methyl group to give C (see also II).

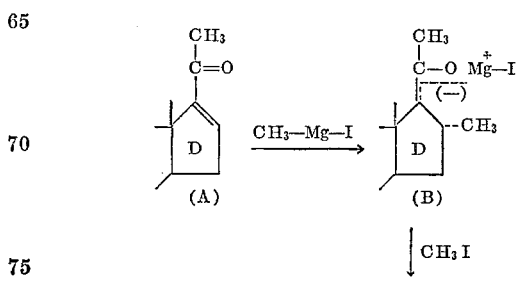

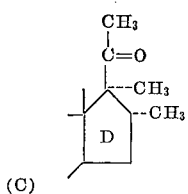

(C)

The 21-oxygen function is introduced by treatment of a 21-halo derivative, preferably the 21-bromide (IV), with an appropriate oxygen nucleophile, preferably the alkali metal salt of an alkanoic acid such as sodium acetate. With the latter reagent, this treatment can be effected satisfactorily on heating, preferably for 10–30 hours, in refluxing ethanol solution or in dimethylformamide solution, preferably at 50° to 75°. Thus, for example, the formation of (VI) from (IV).

The 21-bromo derivative (IV) can be obtained by treatment of the 16α,17α-dimethyl-21-deoxy derivative (II) with bromine in the presence of hydrogen chloride. Alternatively, the 21-halo derivatives, e.g., (IV), can be obtained by way of the 21-alkoxalyl derivatives, such as (III). These intermediates can be prepared from (II) on treatment with a strong base, e.g., an alkali metal hydride or alkali metal alkoxide, and a dialkyl oxalate. This reaction is effected on heating, preferably in an inert solvent such as benzene, for from 15 to 72 hours. The 21-alkoxalyl derivative is first obtained as an alkali metal salt which can be neutralized with acid. This derivative may have the diketo (E) as well as two enolic forms (D) and (F).

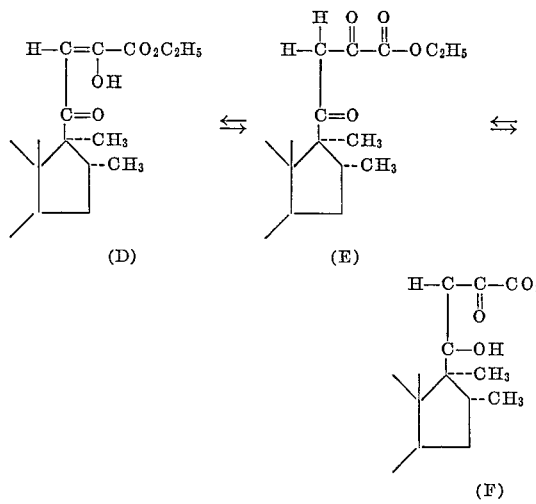

Treatment of the alkali metal salt of the neutral species with bromine, chlorine or iodine, preferably bromine and preferably in the presence of an acid acceptor such as sodium acetate, followed by dealkoxalytion which is effected by heating with a basic reagent, such as sodium acetate, preferably for from 5 to 20 minutes, affords the 21-halo derivative, such as the 21-bromide (IV).

For the development of the ring A dienone, the 3β-hydroxy group is oxidized to a 3-keto [e.g., (VI) to give (V)] by any of the usual methods of steroid chemistry, but preferably with Jones' reagent (chromic oxide in acetone in the presence of sulfuric acid). The two ring A double bonds are then introduced by dehydrogenation with 2,3-dichloro-5,6-dicyanobenzoquinone (DDQ) [e.g., (V) to give (VII)]. This reaction is effected preferably on heating in an inert solvent such as dioxane, preferably for from 10 to 30 hours. It is also possible to convert the 3β-ol [e.g., (VI)] directly to the dienone on treatment with DDQ, but the two-stage sequence is preferable.

Conversion of the 9,11-double bond to the ring (C) fluorohydrin (XI) is effected by transformations well-known to the art of steroid chemistry, via bromohydrin (VIII) and epoxide (IX).

Other 21-acyloxy derivatives are obtainable by hydrolysis of the 21-acetate (XI) by any of the usual methods, such as with potassium carbonate or sodium methoxide in methanol or with perchloric acid in methanol. The resulting 2-hydroxy derivative (X) can then be converted to the desired 21-acylate by treatment with the appropriate acid anhydride in the presence of an acid-acceptor, such as pyridine, sodium acetate or a dialkylamine.

EXAMPLE 1

Preparation of 3β-tetrahydropyranyl-5α-pregna-9(11),16-dien-20-one (I, $R_1$=tetrahydropyranyl)

A solution of 17.8 g. of 3β-hydroxy-5α-pregna-9(11),16-dien-20-one (I, $R_1$=H) in 600 ml. of dry benzene containing 800 mg. of p-toluenesulfonic acid and 40 ml. of freshly distilled dihydropyran is allowed to stand at room temperature for 5 days. After washing with saturated sodium bicarbonate and water, the solution is dried and taken to dryness. The residual syrup is chromatographed on 600 g. of alumina. The column is washed with 500 ml. of n-hexane and 500 ml. of 5% benzene in n-hexane and evaporation of the eluate furnishes crystalline material, recrystallization of which form petroleum ether (boiling point 30–60°) furnishes 11.8 g. (52%) of product, melting point 114–117°. A sample of this compound obtained in a similar experiment is recrystallized twice from petroleum ether to give white crystals, melting point 118–120°; $[\alpha]_D^{25}$+106° (1% in $CHCl_3$);

$\lambda_{max.}^{MeOH}$ 238 m$\mu$ ($\epsilon$ 8,600); $\lambda_{max.}^{KBr}$ 6.00, 6.16, 6.30, 9.75$\mu$.

EXAMPLE 2

Preparation of 3β-hydroxy-16α,17α-dimethyl-5α-pregn-9(11)-en-20-one (II)

(A) From 3β-tetrahydropyranyl-5α-pregna-9(11),16-dien-20-one.—To a Grignard solution prepared from 3.6 g. of magnesium and 13 ml. of methyl iodide in 50 ml. of ether under nitrogen atmosphere is added 350 ml. of purified tetrahydrofuran dropwise whereupon the Grignard separates as a finely divided solid. After the distillation of 250 ml. of solvent, the mixture is cooled to 20° and cuprous bromide (720 mg.) is added, followed by the dropwise addition of 10.5 g. of 3β-tetrahydropyranyl-5α-pregna-9(11)-16-dien-20-one (Example 1) in 100 ml. of tetrahydrofuran. After 1.5 hours there is added, dropwise, 30 ml. of methyl iodide and the resulting mixture is stirred for 18 hours. Saturated ammonium chloride solution (200 ml.) is added followed by 50 ml. of water and 500 ml. of ether. The ethereal solution is washed successively with aqueous sodium thiosulfate solution ammonium chloride solution, and water, dried over magnesium sulfate and then to dryness to give 11.6 g. of fluffy powder. Hydrolysis of the tetrahydropyranyl group is effected by treatment of the material in 300 ml. of methanol with 3 ml. of concentrated hydrochloric acid at room temperature for 1 hour to give 9.5 g. of semi-solid. This material is treated with 9.5 g. of Girard's "T" reagent in 140 ml. of absolute alcohol, containing 14 ml. of acetic acid, at the reflux temperature for 2 hours. The solution is cooled and added to aqueous sodium hydroxide (9 g. in 610 ml.). The resulting mixture is extracted four times with ether and the combined extracts are washed with dilute sodium bicarbonate solution and water. After drying with anhydrous magnesium sulfate, the solvent is removed under reduced pressure to give 5.18 g. (55%) of crude product recrystallization from ether-petroleum ether furnishes 3.6 g. (40%) of white crystals, melting point 192–195°.

In a pilot experiment, the product is recrystallized from ether-petroleum ether to give white crystals, melting point 195–197°; $[\alpha]_D^{25}$ −11° (1% in $CHCl_3$); no significant absorption in the ultraviolet;

$\lambda_{max.}^{KBr}$ 2.94, 5.91, 6.10$\mu$.

N.M.R.: 38.5 ($C_{18}$-$CH_3$), 53 (doublet, J=7 c.p.s.: $C_{16}$-$CH_3$), 56.5 ($C_{19}$-$CH_3$), 62 ($C_{17}$-$CH_3$), 114 (OH), 125 ($C_{21}$-$CH_3$), 215 ($C_3$-H), 322 c.p.s. ($C_{11}$-H); O.R.D. (0.2% dioxane): positive cotton effect, [M] 308, 315+3120°, +2740°.

(B) From 3β-acetoxy-5α-pregna-9(11), 16-dien-20-one (I, $R_1$=acetyl).—Following the methylation procedure described directly above in method (A), from 9.62 g. of 3β-acetoxy-5α-pregna-9(11),16-dien-20-one there is obtained 8.84 g. of fluffy powder. Hydrolysis of the acetyl group is effected by treatment of the material in 400 ml. of methanol with 12 ml. of 10% potassium carbonate solution at the reflux temperature for 30 minutes. The resulting cooled solution is neutralized with 5 ml. of acetic acid, concentrated to a small volume, diluted with water and extracted several times with methylene chloride. The combined extracts are washed with water, dried and taken to dryness to give 8.8 g. of syrup. Treatment of this material with Girard's "T" reagent as described above in method (A) gives 1.88 g. (20%) of product, melting point 184–186°. This material is identical, by the usual criteria, with that obtained in (A) directly above.

EXAMPLE 3

Preparation of sodium salt of 21-ethoxalyl-3β-hydroxy-16α,17-dimethyl-5α-pregn-9(11)-en-20-one (III)

To a solution of 238 mg. of sodium in 40 ml. of dry ethanol is added 2.5 g. of 3β-hydroxy-16α,17-dimethyl-5α-pregn-9(11)-en-20-one (Example 2) followed by a solution of 3.53 g. of freshly distilled ethyl oxalate in 12 ml. of ethanol. The resulting solution is heated at the reflux temperature, under nitrogen atmosphere for 6 hours and then at room temperature for 18 hours followed by concentration to about one-half the original volume. Dilution with ether and filtration furnishes 3.4 g. (100%) of amorphous product;

$\lambda_{max.}^{KBr}$ 2.85, 5.83, 6.02, 6.16, 6.70, 8.15μ

The compound gives a deep red color with 1% alcoholic ferric chloride.

EXAMPLE 4

Preparation of 21-bromo-16α,17-dimethyl-3β-hydroxy-5α-pregn-9(11)-en-20-one (IV)

(A) By bromination of 21-ethoxalyl-3β-hydroxy-16α, 17-dimethyl-5α-pregn-9(11)-en-20-one.—To a stirred solution of 3.5 g. of the sodium salt of 21-ethoxalyl-3β-hydroxy-16α,17-dimethyl-5α-pregn-9(11)-en-20-one (Example 3) and 3.2 g. of anhydrous potassium acetate in 150 ml. of methanol (cooled to 0°) is added dropwise 22 ml. of a solution of 50 ml. of reagent chloroform containing 2.79 g. of bromine. After 30 min. at 0° C., there is added 7.3 ml. of 1 N methanolic sodium methoxide solution. After stirring at room temperature for 15 minutes and then refluxing for 5 minutes, the solution is concentrated to half-volume and diluted with 300 ml. of water. The resulting mixture is extracted three times with methylene chloride. The combined extracts are washed with water, dried, and evaporated to dryness to give 2.4 g. (76%) of amorphous material. The material does not give any color with 1% alcoholic ferric chloride solution;

$\lambda_{max.}^{KBr}$ 2.88, 5.84, 6.13μ

This material is used without further purification.

(B) By bromination of 3β-hydroxy-16α,17-dimethyl-5α-pregn-9(11)-en-20-one.—To a stirred solution of 5 g. of 3β-hydroxy-16α,17-dimethyl-5α-pregn-9(11)-en-20-one (Example 2) in 100 ml. of absolute alcohol (cooled to 0°) is added 10 ml. of a solution of 50 ml. of absolute alcohol containing 18 g. of hydrogen chloride, followed by dropwise addition (1 hr.) of 65 ml. of a solution of 100 ml. of absolute alcohol containing 5.81 g. of bromine. After an additional 5 minutes, the solution is poured into 800 ml. of water and filtered to give 5.88 (96%) of amorphous material. This material is used without further purification.

EXAMPLE 5

Preparation of 21-acetoxy-3β-hydroxy-16α,17-dimethyl-5α-pregn-9(11)-en-20-one (VI)

A solution of 5.9 g. of 21-bromo-3β-hydroxy-16α,17-dimethyl-5α-pregn-9(11)-en-20-one (Example 4(B)) and 3.4 g. of anhydrous sodium acetate in 55 ml. of dimethylformamide containing 0.2 ml. acetic acid is stirred in an atmosphere of nitrogen at 55–60° C. for 72 hours. The cooled solution is poured into 300 ml. of water and the resulting solution is extracted three times with methylene chloride. The combined extracts are washed with water, dried, and evaporated to dryness to furnish an amorphous solid. The material is dissolved in 25 ml. of benzene and chromatographed on 150 g. of silica gel. The column is washed with 1 liter of benzene, and 1 liter of 5% ether-in-benzene; these washings are discarded. Elution with 3 liters of 10% ether-in-benzene, followed by evaporation of the eluate, gives 3.2 g. of product. Two recrystallizations from acetone-petroleum ether gives white crystals, melting point 131–132° C.; no significant absorption in the ultraviolet.

In another experiment, treatment of 2.4 g. of 21-bromo-3β - hydroxy - 16α,17 - dimethyl - 5α - pregn - 9(11) - en-20-one (Example 4(A)) in 130 ml. of dimethylformamide with 7 g. of anhydrous sodium acetate furnishes 616 mg., melting point 128–130° C.

EXAMPLE 6

Preparation of 21-acetoxy-16α,17-dimethyl-5α-pregn-9(11)-ene-3,20-dione (V)

To a solution of 2.0 g. of 21-acetoxy-3β-hydroxy-16α, 17-dimethyl-9(11)-pregn-20-one (Example 5) in 240 ml. of acetone, cooled to 0°, is added rapidly with stirring 1.8 ml. of Jones' reagent. After 5 minutes, the reaction mixture is diluted with 1 liter of iced water, stirred for 10 minutes and then filtered. Filtration of the residue with ether followed by filtration gives 1.73 g. (87%) of product, melting point 140–142° C.

In a pilot experiment the yield is 551 mg. (89%). Recrystallization from ether-petroleum ether furnishes white crystals, melting point 133–135° C.; [α]$_D^{25}$ —13° (1% in $CHCl_3$); no significant absorption in the ultraviolet;

$\lambda_{max.}^{KBr}$ 5.75 5.85, 6.08, 8.13μ

EXAMPLE 7

Preparation of 21-acetoxy-16α-17-dimethylpregna-1,4, 9(11)-triene-3,20-dione (VII)

A solution of 1.7 g. of 21-acetoxy-16α,17-dimethyl-5α-pregn-9(11)-ene-3,20-dione (Example 6) and 2.9 g. of recrystallized 2,3-dichloro-5,6-dicyanobenzoquinone in 150 ml. of purified dioxane is heated at the reflux temperature for 24 hours. The cooled reaction mixture is filtered and the filtrate is concentrated to half volume. The resulting solution is diluted with methylene chloride and washed successively with 5% sodium hydroxide solution, saline, and water. After drying, the solution is evaporated to dryness leaving 1.1 g. of an amorphous solid. This material is partition chromatographed on diatomaceous earth using the heptane: methanol partition system. The stationary phase is thoroughly mixed (0.5 ml./g.) with diatomaceous earth and the mix is packed into a glass column. The reaction product is dissolved in 50 ml. of the lower phase, mixed with 100 g. of diatomaceous earth and packed on top of the column. The hold-back volume (HBV) is 1700 ml. and the Vm/Vs ratio is 3.1. The product is isolated from the fraction with peak at 4.5 HBV; yield 635 mg. (37%). Recrystallization from ether-petroleum ether gives white crystals, melting point 126–128° C.; [α]$_D^{25}$ —64° (1% in $CHCl_3$);

$\lambda_{max.}^{CH_3OH}$ 237 mμ (ε 14,300); $\lambda_{max.}^{KBr}$ 5.68, 5.81, 5.98, 6.13, 6.21, 8.10μ

EXAMPLE 8

Preparation of 21-acetoxy-9α-bromo-11β-hydroxy-16α,17-dimethylpregna-1,4-diene-3,20-dione (VIII)

To a solution of 983 mg. of 21-acetoxy-16α,17-dimethylpregna-1,4,9(11)-triene-3,20-dione (Example 7) in 49 ml. of dioxane containing 8.7 ml. of water, stirred in a tap-water bath, is added 687 mg. of recrystallized N-bromoacetamide followed by 4.07 ml. of 10% aqueous perchloric acid. After stirring for 25 minutes, the solution is adjusted to pH 7 by the addition of aqueous sodium sulfite solution and then poured into about 325 ml. of water. The solid is collected to give 1.03 g. (85%) of product, melting point 159° C.

In a pilot experiment, the yield is 823 mg. (74%), melting point 161° C. dec. Recrystallization from methylene chlorideether does not alter the melting point; $[\alpha]_D^{25}$ +74°;

$\lambda_{max.}^{CH_3OH}$ 241 mμ (ε 13,000); $\lambda_{max.}^{KBr}$ 3.00, 5.72, 5.84, 6.03, 6.20, 6.23 (sh.), 8.12μ

EXAMPLE 9

Preparation of 21-acetoxy-9β,11β-epoxy-16α,17-dimethyl-pregna-1,4-diene-3,20-dione (IX)

A solution of 1.03 g. of 21-acetoxy-9α-bromo-11β-hydroxy-16α,17-dimethylpregna-1,4-diene-3,20-dione (Example 8) and 510 mg. of anhydrous potassium acetate in 140 ml. of absolute alcohol is heated at the reflux temperature for 18 hours. After concentration to a small volume, the solution is diluted with water and filtered to give 523 mg. (62%) of product, melting point 148–149° C.

In a pilot experiment, 758 mg. of starting material furnishes 617 mg. of amorphous solid. This solid is dissolved in 15 ml. of benzene and chromatographed on 25 g. of silica gel. The column is washed with 100 ml. of benzene, 100 ml. of 5% ether-in-benzene, and 100 ml. of 10% ether-in-benzene; these washings are discarded. Elution with 500 ml. of 15% ether-in-benzene then 500 ml. of 20% ether-in-benzene followed by evaporation of the eluate and recrystallization of the residue from methylene chloride-ether-petroleum ether affords 394 mg. (62%) of product, melting point 149–150° C.; $[\alpha]_D^{25}$ −6° (0.8% in CHCl₃);

$\lambda_{max.}^{CH_3OH}$ 248 mμ (ε 15,100); $\lambda_{max.}^{KBr}$ 5.72, 5.82, 5.99, 6.13, 622, 8.10μ

EXAMPLE 10

Preparation of 21-acetoxy-9α-fluoro-11β-hydroxy-16α,17-dimethylpregna-1,4-diene-3,20-dione (XI)

To a solution of 325 mg. of 21-acetoxy-9β,11β-epoxy-16α,17-dimethylpregna-1,4-diene-3,20-dione (Example 9) in 7 ml. of purified tetrahydrofuran and 11 ml. of methylene chloride previously chilled to −50° C. is added 4 ml. of anhydrous hydrogen fluoride The mixture is stirred at −50° C. for 10 minutes and then at 0° C. for 4 hours. The reaction mixture is poured into excess sodium bicarbonate solution and diluted with methylene chloride. The organic layer is washed with water, dried and evaporated to dryness to give 277 mg. of crude product. This material is partition chromatographed on diatomaceous earth using the heptane:ethyl acetate:methanol:water (80:20:15:6) partition system. The stationary phase is thoroughly mixed (0.5 ml./g.) with diatomaceous earth (400 g.) and the mix is packed into a glass column. The reaction product is dissolved in 10 ml. of the lower phase, mixed with 20 g. of diatomaceous earth and packed on top of the column. The hold-back-volume (HBV) is 630 ml. and the V$m$/V$s$ ratio is 3.0. The product is isolated from the fraction with HBV 10 and is recrystallized from acetone-petroleum ether to furnish 133 mg. (40%) as white crystals, melting point 228–230° C. dec. Recrystallization from methylene chloride-ether does not raise the melting point; $[\alpha]_D^{25}$+50° (0.3% in CHCl₃);

$\lambda_{max.}^{CH_3OH}$ 239 mμ (ε 15,600); $\lambda_{max.}^{KBr}$ 2.86, 5.73, 5.86, 6.02, 6.16, 6.23, 8.09μ

EXAMPLE 11

Preparation of 9α-fluoro-11β,21-dihydroxy-16α,17α-dimethylpregna-1,4-diene 3,20-dione (X)

To a solution of 1 g. of 21-acetoxy-9α-fluoro-11β-hydroxy-16α,17-dimethylpregna-1,4-diene-3,20-dione (Example 10) in 80 ml. of methanol is added 2 ml. of 10% aqueous potassium carbonate and the mixture is agitated at room temperature with a stream of nitrogen for 20 minutes. After the addition of 1 ml. of glacial acetic acid and evaporation to one-third volume, water is added followed by filtration to give 9α-fluoro-11β-21-dihydroxy-16α,17-dimethylpregn-1,4-dione;

$\lambda_{max.}^{CH_3OH}$ 238 mμ (ε 15,000); $\lambda_{max.}^{KBr}$ 2.90, 5.85, 6.01, 6.13, 6.19μ

EXAMPLE 12

Preparation of 9α-fluoro-21-hexanoyloxy-11β-hydroxy-16α,17-dimethylpregna-1,4-diene-3,20-dione (XII, R=pentyl)

A solution of 1 g. of 9α-fluoro-11β,21-dihydroxy-16α,17-dimethylpregna-1,4-diene-3,20-dione (Example 11) in 20 ml. of pyridine containing 4 ml. of hexanoic anhydride is allowed to stand at room temperature for 18 hours. Dilution with water, followed by filtration affords 9α-fluoro-21-hexanolyloxy-11β-hydroxy-16α,17-dimethylpregna-1,4-diene-3,20-dione;

$\lambda_{max.}^{CH_3OH}$ 239 mμ (ε 16,000); $\lambda_{max.}^{KBr}$ 2.86, 5.73, 5.86, 6.02, 6.16, 6.23, 8.08μ

What is claimed is:

1. A process for the preparation of 16α,17α-dimethylpregn-20-ones comprising treating in a non-prototropic solvent a 16-dehydropregn-20-one with methyl magnesium halides, and subsequently treating with a methyl halide.
2. A process for the preparation of 16α,17α-dimethylpregn-20-ones comprising treating in tetrahydrofuran a 16-dehydropregn-20-one with methyl magnesium halides and subsequently treating with a methyl halide.

References Cited

UNITED STATES PATENTS

| | | | |
|---|---|---|---|
| 2,860,148 | 11/1958 | Hershberg | 260—397.45 |
| 3,099,654 | 7/1963 | Joly et al. | 260—239.55 |
| 3,290,338 | 12/1966 | Shapiro et al. | 260—397.4 |
| 3,370,072 | 2/1968 | Fried | 260—397.45 |
| 3,361,744 | 1/1968 | Schaub et al. | 260—239.55 |

FOREIGN PATENTS 6515108   6/1966   Netherlands.

OTHER REFERENCES

Marker et al.: Journ. Amer. Chem. Soc., vol. 64, June 1962, pp. 1280–1281.

Chem. Abstracts, 65:15466, abstract in English of patent cited above.

LEWIS GOTTS, Primary Examiner

ETHEL G. LOVE, Assistant Examiner

U.S. Cl. X.R.

260—239.55, 397.1, 999